(12) United States Patent
Nahler et al.

(10) Patent No.: US 11,209,372 B2
(45) Date of Patent: Dec. 28, 2021

(54) METHOD, APPARATUS AND COMPUTER PROGRAM FOR DETECTING A PRESENCE OF AIRBORNE PARTICLES

(71) Applicant: Infineon Technologies AG, Neubiberg (DE)

(72) Inventors: Caterina Nahler, Thondorf (AT); Hannes Plank, Graz (AT); Armin Schoenlieb, Seiersberg-Pirka (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 16/788,388

(22) Filed: Feb. 12, 2020

(65) Prior Publication Data

US 2020/0256806 A1 Aug. 13, 2020

(30) Foreign Application Priority Data

Feb. 13, 2019 (EP) .................................... 19156978

(51) Int. Cl.
*G01N 21/94* (2006.01)
*G06T 7/55* (2017.01)
(Continued)

(52) U.S. Cl.
CPC ......... *G01N 21/94* (2013.01); *G01N 21/1717* (2013.01); *G01N 21/8851* (2013.01);
(Continued)

(58) Field of Classification Search
CPC .... G01N 27/4162; G01N 27/68; G01N 2/745; G01N 27/92; G01N 2800/122;
(Continued)

(56) References Cited

U.S. PATENT DOCUMENTS 9,228,919 B1 * 1/2016 Hawwa ................... G01M 3/38
9,677,986 B1 * 6/2017 Baldwin ................ G01N 15/06
(Continued)

FOREIGN PATENT DOCUMENTS

DE 102013224937 A1 6/2015
EP 3206045 A1 8/2017
(Continued)

*Primary Examiner* — Michael P Stafira
(74) *Attorney, Agent, or Firm* — Murphy, Bilak & Homiller, PLLC

(57) ABSTRACT

Examples relate to a method, an apparatus and a computer program for detecting a presence of airborne particles. A reference measurement of an environment of a depth image sensor module is obtained. The reference measurement is based on a measurement of modulated light in a first time interval. The modulated light is reflected by features of the environment of the depth image sensor module. A subsequent measurement of modulated light is obtained in a second time interval. The presence of the airborne particles is detected based on the subsequent measurement of the modulated light, by using the reference measurement performed in the first time interval to disregard all or part of the features of the environment of the depth image sensor module. A signal indicative of one or more properties of the detected airborne particles is generated based on the detected presence of the airborne particles.

11 Claims, 3 Drawing Sheets

(51) Int. Cl.
*G01N 21/17* (2006.01)
*G01N 21/88* (2006.01)
*G06T 7/00* (2017.01)

(52) U.S. Cl.
CPC .............. *G06T 7/0002* (2013.01); *G06T 7/55* (2017.01); *G01N 2021/1757* (2013.01); *G01N 2021/1765* (2013.01); *G01N 2021/8887* (2013.01); *G06T 2207/10028* (2013.01)

(58) Field of Classification Search
CPC .. G01N 2800/324; G01N 30/06; G01N 30/56; G01N 30/6047; G01N 30/72; G01N 30/7273; G01N 31/00; G01N 33/0006; G01N 33/0016; G01N 33/0021; G01N 33/0027; G01N 33/0054; G01N 33/03; G01N 33/2858; G01N 33/5008; G01N 33/5088; G01N 33/542; G01N 33/54326; G01N 33/6845; G01N 33/948; G01N 35/1004; G01N 35/1097; G01N 5/04; G01N 1/2813; G01N 1/34; G01N 15/04; G01N 15/0643; G01N 15/0826; G01N 15/1431; G01N 2001/2217; G01N 2009/024; G01N 2015/0003; G01N 2015/0662; G01N 2015/1037; G01N 2015/1093; G01N 2015/1415; G01N 2015/149; G01N 2021/0106; G01N 2021/0112; G01N 2021/1744; G01N 2021/1759; G01N 2021/178; G01N 2021/3531; G01N 2021/4704; G01N 2021/4707; G01N 2021/513; G01N 2021/516; G01N 2021/5969; G01N 2021/6476; G01N 2021/8477; G01N 2021/8585; G01N 2021/8822; G01N 2021/9511; G01N 2021/9586; G01N 2033/0072; G01N 2035/00831; G01N 2035/0091; G01N 21/031; G01N 21/13; G01N 21/171; G01N 21/27; G01N 21/359; G01N 21/63; G01N 21/72; G01N 21/8803; G01N 21/952; G01N 22/04; G01N 2201/0616; G01N 2201/06193; G01N 2201/0625; G01N 2201/0628; G01N 2201/064; G01N 2201/066; G01N 2201/0693; G01N 2201/0695; G01N 2201/1244; G01N 2223/01; G01N 2223/076; G01N 2223/635; G01N 2291/012; G01N 2291/014; G01N 2291/02425; G01N 2291/02845; G01N 2291/0423; G01N 2291/044; G01N 2291/106; G01N 23/00; G01N 23/2008; G01N 23/223; G01N 2333/195; G01N 2333/4706; G01N 2333/4725; G01N 2405/00; G01N 2405/04; G01N 2405/08; G01N 2415/00; G01N 2458/00; G01N 25/66; G01N 2500/02; G01N 27/00; G01N 27/023; G01N 27/028; G01N 27/041; G01N 27/221; G01N 27/223; G01N 27/225; G01N 27/407; G01N 27/416; G01N 27/624; G01N 27/626; G01N 27/72; G01N 2800/24; G01N 2800/325; G01N 29/11; G01N 29/2418; G01N 29/2462; G01N 29/34; G01N 3/00; G01N 30/02; G01N 30/724; G01N 30/74; G01N 30/95; G01N 30/96; G01N 33/0013; G01N 33/0014; G01N 33/0024; G01N 33/0029; G01N 33/005; G01N 33/0098; G01N 33/02; G01N 33/44; G01N 33/48707; G01N 33/48735; G01N 33/493; G01N 33/5044; G01N 33/5047; G01N 33/505; G01N 33/5052; G01N 33/569; G01N 33/57488; G01N 33/6848; G01N 33/6851; G01N 33/6854; G01N 35/08; G01N 9/02; G06T 11/2006; G06T 2207/10028; G06T 2207/10016; G06T 2200/04; G06T 19/006; G06T 2207/20084; G06T 7/0004; G06T 2207/20081; G06T 2207/30232; G06T 2207/30164; G06T 2207/30168; G06T 7/40; G06T 15/00; G06T 2207/10072; G06T 2207/10088; G06T 2207/30004; G06T 2207/30236; G06T 7/0012; G06T 7/277; G06T 7/33; G06T 1/20; G06T 13/60; G06T 2215/16; G06T 7/254; G06T 7/30; G06T 2210/56; G06T 7/20; G06T 17/00; G06T 7/0002; G06T 7/11; G06T 7/70; G06T 2207/30252; G06T 15/04; G06T 19/00; G06T 19/003; G06T 19/20; G06T 2207/20076; G06T 2207/30256; G06T 2210/21; G06T 3/4053; G06T 7/00; G06T 7/60; G06T 15/08; G06T 15/20; G06T 15/205; G06T 17/05; G06T 2200/24; G06T 2207/30132; G06T 2207/30192; G06T 5/007; G06T 5/50; G06T 7/90; G06T 11/001; G06T 13/20; G06T 15/06; G06T 15/503; G06T 17/005; G06T 17/10; G06T 17/20; G06T 2207/10024; G06T 2207/10068; G06T 2207/10148; G06T 2207/10152; G06T 2207/20021; G06T 2207/20212; G06T 2207/30148; G06T 2207/30181; G06T 2207/30196; G06T 2207/30201; G06T 2207/30261; G06T 2210/24; G06T 2210/36; G06T 2210/61; G06T 5/001; G06T 5/002; G06T 7/001; G06T 7/13; G06T 7/136; G06T 7/44; G06T 7/521; G06T 7/55; G06T 7/586; G06T 7/62; G06T 7/74; G01B 11/03; G02B 13/0035; G02B 13/008; G02B 13/06; G02B 27/142; G02B 27/283; G02B 6/0001
See application file for complete search history.

(56) References Cited

U.S. PATENT DOCUMENTS

| | | | | |
|---|---|---|---|---|
| 2008/0297360 | A1* | 12/2008 | Knox | G01S 7/4873 340/628 |
| 2010/0277713 | A1* | 11/2010 | Mimeault | G01S 7/4865 356/5.01 |
| 2010/0309024 | A1* | 12/2010 | Mimeault | G08G 1/14 340/932.2 |
| 2021/0041220 | A1* | 2/2021 | Van Weeren | G01B 11/161 |

FOREIGN PATENT DOCUMENTS

| | | | | |
|---|---|---|---|---|
| WO | WO-2009017721 | A2 * | 2/2009 | ............. G01N 21/51 |
| WO | WO-2009149498 | A1 * | 12/2009 | ............ G01N 21/538 |
| WO | WO-2010124347 | A1 * | 11/2010 | ......... H01L 29/1029 |

* cited by examiner

METHOD, APPARATUS AND COMPUTER PROGRAM FOR DETECTING A PRESENCE OF AIRBORNE PARTICLES

TECHNICAL FIELD

Examples relate to a method, an apparatus and a computer program for detecting a presence of airborne particles.

BACKGROUND

Depth image cameras, such as Time of Flight (ToF) cameras or structured light cameras, are often used to determine a distance between a sensor of the cameras and objects surrounding the camera. For example, ToF cameras are based on a measurement of a delay between the emission of an optical infra-red (IR) signal, which is then reflected by an object, and the reception of the optical signal at a photon mixing device (PMD) imager. The measured delay is proportional to the distance of the object. Structured light cameras are based on projecting a pre-defined pattern onto the surface of objects in the environment of a sensor of the structured light camera. Based on a deformation of the pre-defined pattern at the surface of the objects, a distance between the sensor and the respective objects may be calculated. Both approaches may be used to determine a depth image that is based on the distances of the objects relative to the sensors of the respective cameras.

SUMMARY

An example relates to a method for detecting a presence of airborne particles. The method comprises obtaining a reference measurement of an environment of a depth image sensor module. The reference measurement is based on a measurement of modulated light in a first time interval. The modulated light is reflected by features of the environment of the depth image sensor module. The method comprises obtaining a subsequent measurement of modulated light in a second time interval. The method comprises detecting the presence of the airborne particles based on the subsequent measurement of the modulated light. The presence of the airborne particles is detected by using the reference measurement performed in the first time interval to disregard all or part of the features of the environment of the depth image sensor module. The method comprises generating a signal indicative of one or more properties of the detected airborne particles based on the detected presence of the airborne particles.

An example relates to an apparatus for detecting a presence of airborne particles. The apparatus comprises an interface for communicating with a depth image sensor module. The apparatus comprises a processing module configured obtain a reference measurement of an environment of the depth image sensor module from the depth image sensor module. The reference measurement is based on a measurement of modulated light in a first time interval. The modulated light is reflected by features of the environment of the depth image depth image sensor module. The processing module is configured to obtain a subsequent measurement of modulated light from the depth image sensor module in a second time interval. The processing module is configured to detect the presence of the airborne particles based on the subsequent measurement of the modulated light. The presence of the airborne particles is detected by using the reference measurement performed in the first time interval to disregard all or part of the features of the environment of the sensor module. The processing module is configured to generate a signal indicative of one or more properties of the detected airborne particles based on the detected presence of the airborne particles.

An example relates to a system comprising an apparatus for detecting a presence of airborne particles and a depth image sensor module. The apparatus comprises an interface for communicating with a depth image sensor module. The apparatus comprises a processing module configured obtain a reference measurement of an environment of the depth image sensor module from the depth image sensor module. The reference measurement is based on a measurement of modulated light in a first time interval. The modulated light is reflected by features of the environment of the depth image depth image sensor module. The processing module is configured to obtain a subsequent measurement of modulated light from the depth image sensor module in a second time interval. The processing module is configured to detect the presence of the airborne particles based on the subsequent measurement of the modulated light. The presence of the airborne particles is detected by using the reference measurement performed in the first time interval to disregard all or part of the features of the environment of the sensor module. The processing module is configured to generate a signal indicative of one or more properties of the detected airborne particles based on the detected presence of the airborne particles. The depth image sensor module is configured to perform the reference measurement and the subsequent measurement. The depth image sensor module is configured to provide the reference measurement and the subsequent measurement to the processing module via the interface.

BRIEF DESCRIPTION OF THE FIGURES

Some examples of apparatuses and/or methods will be described in the following by way of example only, and with reference to the accompanying figures, in which.

DETAILED DESCRIPTION

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) used herein in their ordinary meaning of the art to which the examples belong.

Figure 1A:
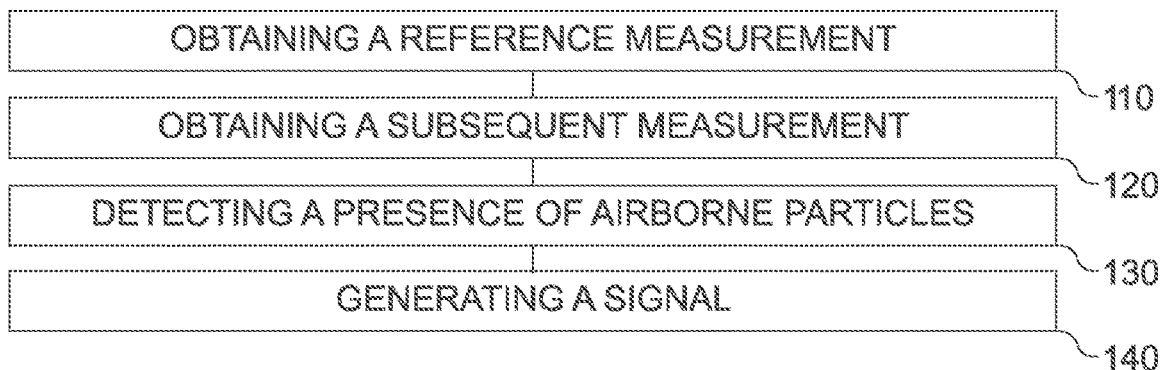
FIGS. 1a and 1b illustrate flow charts of embodiments of a method for detecting a presence of airborne particles.
Figure 1B:
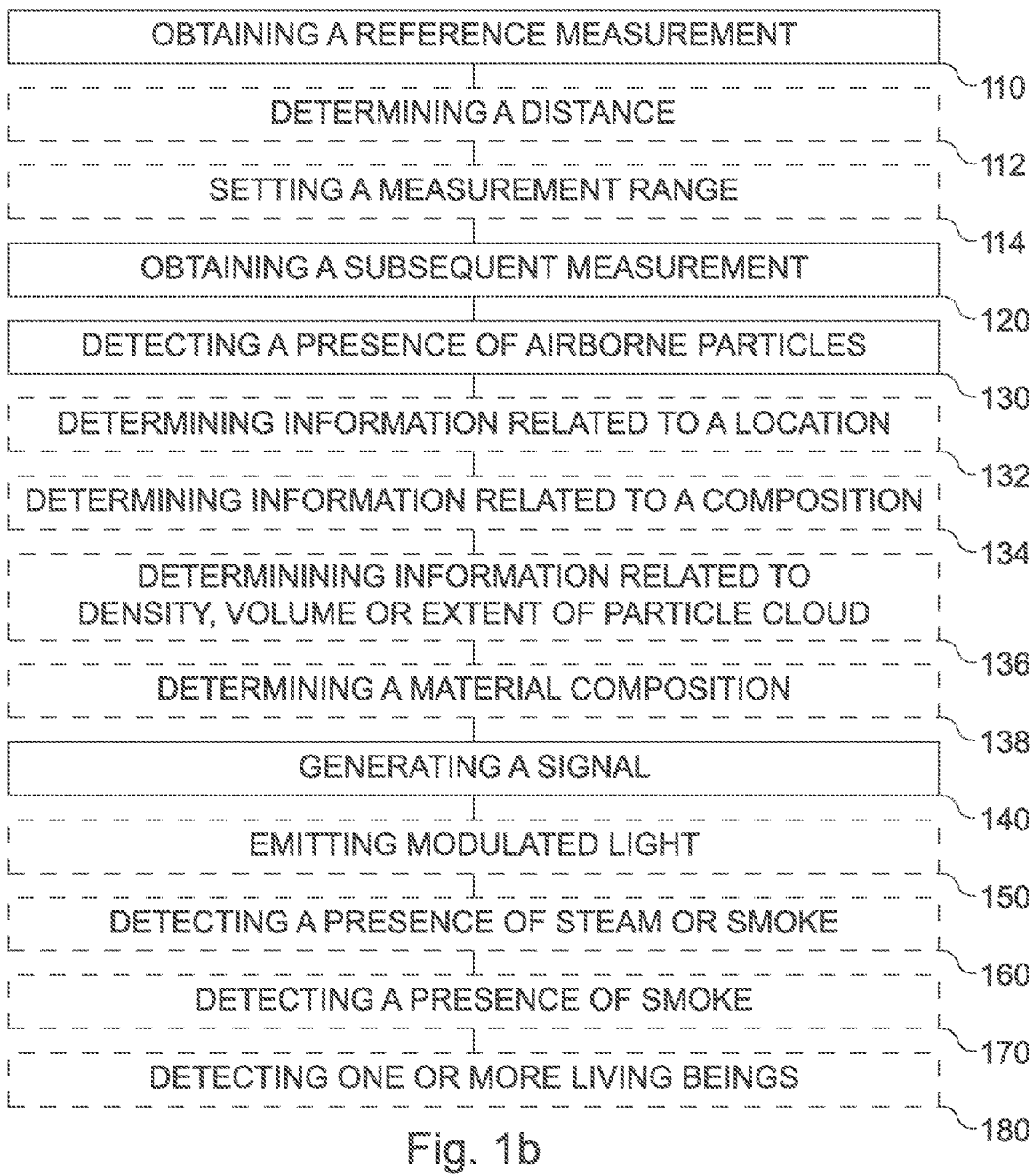

FIGS. 1a and 1b illustrate flow charts of embodiments of a method for detecting a presence of airborne particles. The method comprises obtaining 110 a reference measurement of an environment of a depth image sensor module. The reference measurement is based on a measurement of modulated light in a first time interval. The modulated light is reflected by features of the environment of the depth image sensor module. The method comprises obtaining 120 a subsequent measurement of modulated light in a second time interval. The method comprises detecting 130 the presence of the airborne particles based on the subsequent measurement of the modulated light. The presence of the airborne particles is detected by using the reference measurement performed in the first time interval to disregard all or part of the features of the environment of the depth image sensor module. The method comprises generating 140 a signal indicative of one or more properties of the detected airborne particles based on the detected presence of the airborne particles.

Figure 1C:
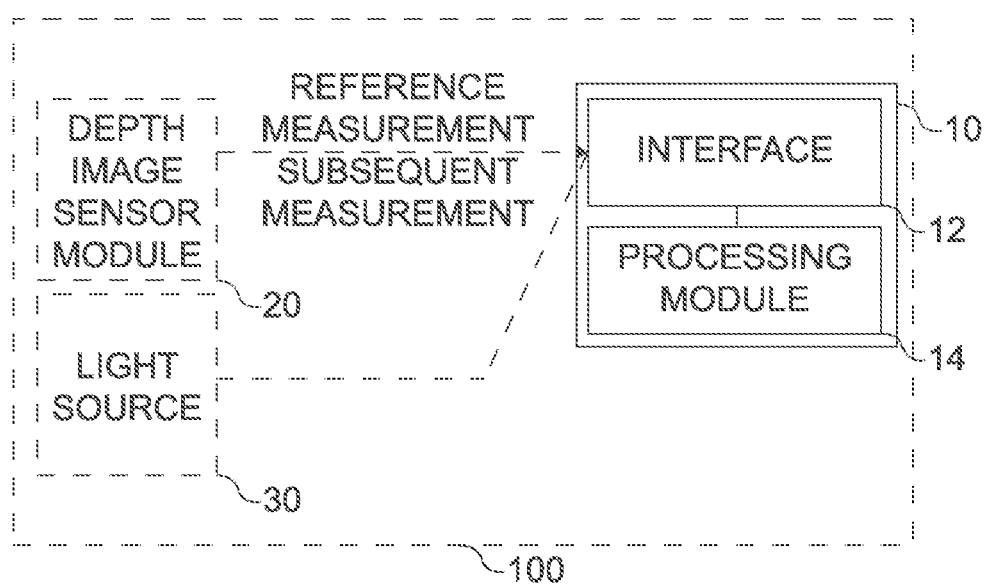
FIG. 1c illustrates a block diagram of an embodiment of an apparatus for detecting a presence of airborne particles, and of a system comprising an apparatus for detecting a presence of airborne particles and a depth image sensor module.

FIG. 1c illustrates a block diagram of an embodiment of an corresponding) apparatus 10 for detecting a presence of airborne particles. FIG. 1c further shows a block diagram of an embodiment of a system 100 comprising the apparatus for detecting a presence of airborne particles and comprising a depth image sensor module 20. The apparatus 10 comprises an interface 12 for communicating with a depth image sensor module 20. The apparatus 10 comprises a processing module 14, which is coupled to the interface 12. The processing module may be configured to execute the method introduced in connection with FIGS. 1a and/or 1b, e.g. in conjunction with the interface 12. The processing module 14 is configured to obtain a reference measurement of an environment of the depth image sensor module from the depth image sensor module. The reference measurement is based on a measurement of modulated light in a first time interval. The modulated light is reflected by features of the environment of the depth image depth image sensor module. The processing module 14 is configured to obtain a subsequent measurement of modulated light from the depth image sensor module in a second time interval. The processing module 14 is configured to detect the presence of the airborne particles based on the subsequent measurement of the modulated light. The presence of the airborne particles is detected by using the reference measurement performed in the first time interval to disregard all or part of the features of the environment of the sensor module. The processing module is configured to generate a signal indicative of one or more properties of the detected airborne panicles based on the detected presence of the airborne particles. The system 100 comprises the apparatus 10 and the depth image sensor module 20. The depth image sensor module 20 may be configured to perform the reference measurement and the subsequent measurement. The depth image sensor module may be configured to provide the reference measurement and the subsequent measurement to the processing module 14 via the interface 12.

The following description relates to both the method of FIGS. 1a and/or 1b and the apparatus 10 and/or system 100 of FIG. 1c.

Embodiments are based on the finding that the detection of airborne particles may be performed using modulated light, e.g. such as modulated light that is used in Time of Flight (ToF) or structured light depth sensing scenarios. In order to achieve the detection of the airborne particles, embodiments perform a reference measurement of the background of an area surrounding the depth image sensor. This reference measurement is then used to disregard the background, for example by computationally removing the background from the subsequent measurement in some embodiments, or by adjusting the emission of the modulated light such, that the measurement range excludes the background.

Embodiments are not limited to a single depth image sensor technology. While some embodiments are described in connection with ToF depth image sensor modules, other depth image sensor modules may also be used, e.g. depth image sensor modules that are based on using structured light.

The method, apparatus and system introduced in connection with FIGS. 1a to 1c may be used to detect a presence of airborne particles. In examples, the airborne particles may range from particles as found in steam or smoke, i.e. fine particulate matter, up to larger airborne particles, such as raindrops, hailstones or snowflakes. For example, airborne particles may comprise at least one of dust, fog, rain, snow, fume and vaporized water. In general, the airborne particles may be particles that are present between the background of the environment of the depth image sensor module and the depth image sensor module itself. Airborne particles may refer both to airborne particles that float through the air, e.g. propelled by heat, such as in wet steam or in smoke, and to airborne particles that fall through the air, such as raindrops, snowflakes or hailstones.

Embodiments of the method, apparatus, and computer program are directed at detecting the presence of the airborne particles. In some cases, merely the presence of the airborne particles might be detected, i.e. that airborne particles that have specific pre-defined properties are present in the environment of the depth image sensor module. The signal indicative of the one or more properties of the detected airborne particles may indicate the presence of the one or more particles, i.e. that the environment of the depth image sensor module comprises airborne particles that have the specific pre-defined property. In some other cases, the detection of the presence of the airborne particles may further comprise determining one or more properties of the airborne particles based on the detection of the particles. The one or more properties of the airborne particles may then be included in the signal indicative of the one or more properties of the detected airborne particles.

The method comprises obtaining 110 a reference measurement of an environment of a depth image sensor module. For example, if the method is executed by a processing module or processing device (e.g. the apparatus 10), the reference measurement may be obtained by receiving the reference measurement from the depth image sensor module (e.g. via the interface 12) or by reading out the reference measurement from the depth image sensor module (e.g. via the interface 12). If the method is executed by a system comprising both the processing module (or the apparatus 10) and the depth image sensor module, the reference measurement may be obtained by performing the reference measurement using the depth image sensor module and the processing module or apparatus 10 receiving or reading out the reference measurement from the depth image sensor module. For example, the depth image sensor module may be a ToF sensor module, or a structured light sensor module.

The reference measurement is based on a measurement of modulated light in a first time interval. For example, the modulated light may have a wavelength between 350 nm and 0.01 cm, i.e. the modulated light may be modulated infrared light or modulated visible light. For example, the modulated light may originate from a light source configured to emit the modulated light. As shown in FIG. 1c, the system 100 may further comprise the light source 30. The light source may be controlled by the processing module 14 (e.g. via the interface 12) The method may, as shown in FIG. 1b, comprise emitting 150 the modulated light. For example, the modulated light may be continuous wave modulated light, e.g. based on a continuous square wave modulation, which may be omitted by a continuous wave light source of a ToF camera system. In this case, the system may be a ToF camera system, comprising the continuous wave light source. Alternatively, the modulated light may be emitted by a light source of a ToF camera system, but instead of a continuous wave modulation, a coded modulation may be used. In other words, the modulated light may be modulated light that is based on a coded modulation of the light. Coded modulation in Time-of-Flight imaging is about altering the sequence of the emitted light-pulses and the corresponding pixel modulation signal. This may enable customizing the phase-distance function. In ToF, coded modulation may be based on replacing the square wave signal with a code sequence, which is repeated for the phase image exposure time. For the code design, different kind of codes like maximum length code, gold code or barker code can be used. In other words, the coded modulation may be based on one of a maximum length code, a gold code or barker code.

In the context of ToF cameras, the coded modulation may be used instead of continuous wave modulation. In order to omit the influence of the reflectivity on the depth image, ToF depth algorithms may require more than one phase image. In continuous wave operation mode, this is achieved by shifting the phase-offset by 90° to the reference signal. For coded modulation, a similar approach may be used. Here one of the signals may be delayed or rotated to create a phase-offset. The position of the correlation peak may be adjusted by rotating the code sequence. Each code may comprise a smallest signal part (i.e. a shortest sequence of the same signal value). In at least some embodiments, two or more coded modulation images may be shifted by a multiple of the smallest signal part.

Alternatively, the coded modulation may also be applied to structured light. The modulated light may be based on an emission of structured light. This may enable a usage of relatively simple image sensors in the detection of the airborne particles. In this case, the depth image sensor module may be a structured light sensor module. Structured light is the process of projecting a known pattern, such as a grid or horizontal bars, on to a scene. The way that the grid or the horizontal bars deform when it/they hit a surface, such as a wall in the background, may be used to calculate the depth and surface information of the objects in the scene. In at least some embodiments, the emission of the structured light may further be based on a coded modulation, e.g. to enable a depth sensing at a pre-defined distance from the depth image sensor module.

The modulated light is reflected by features of the environment of the depth image sensor module. For example, the features of the environment may be static features or background features. The background features or static features may be features that are present when the reference measurement is taken, where it might be assumed that the airborne particles of interest are not present. In at least some embodiments, the reference measurement may correspond to a depth measurement that comprises (only or mostly) depth information of features that are part of the background of the environment of the depth image sensor. In some cases, e.g. if the depth image sensor module is statically attached to a location, the reference measurement may be taken once or in longer intervals, in some other cases, e.g. if the depth image sensor module is moved relative to its environment, the reference measurement may be taken in shorter intervals.

In at least some embodiments, the modulated light may be based on a coded modulation of light. As further shown in FIG. 1b, the method may comprise determining 112 a distance between the depth image sensor module and the features of the environment based on the reference measurement of the environment. For example, the distance between the depth image sensor module and the features of the environment may be determined based on continuous wave modulated light or based on structured light, e.g. using ToF depth image sensing that is based on continuous wave modulation of light or using depth image sensing that is based on structured light.

Alternatively, the distance between the depth image sensor module and the features of the environment may be determined based on the coded modulation of the modulated light. For example, the distance between the depth image sensor module and the features of the environment may be determined 112 based on two or more coded modulation images comprised in the reference measurement. The two or more coded modulation images comprised in the reference measurement of the environment may be used to "sweep" the environment of the depth image sensor module to determine the distance between the depth image sensor module and the features of the environment. In other words, the method may comprise emitting the coded modulation-based modulated light such that the modulated light forms correlation peaks at two or more distances from the depth image sensor module. This may be achieved by rotating a code sequence that is used for the coded modulation of the modulated light so that the correlation peak of the modulated light occurs at the two or more distances. The method may comprise obtaining the reference measurement comprising the two or more coded modulation images having their respective correlation peaks at the two or more distances from the depth image sensor module. The method may comprise determining the distance between the depth image sensor module and the features of the environment based on the reference measurement comprising the two or more coded modulation images having their respective correlation peaks at the two or more distances from the depth image sensor module.

The method may comprise setting 114 a measurement range of the coded modulation of the modulated light to a region located between the depth image sensor module and the features of the environment in the second lime interval. The measurement range may correspond to a distance range between the depth image sensor module and the background, wherein correlation peaks of the coded modulation-based modulated light occur within the distance range, and/or wherein the distance range is delimited by the correlation peaks of the coded modulation-based modulated light. To obtain a measurement range using coded modulation, the subsequent measurement range may comprise two or more coded modulation images, i.e. at least a first coded modulation image having a correlation peak that is located closest to the depth image sensor module and a second coded modulation image having a correlation peak that is located furthest away from the depth image sensor module. The measurement range may denote the range between the correlation peak of the first coded modulation image and the correlation peak of the second coded modulation image. The correlation peaks of further coded modulation images of the two or more coded modulation images may be located between the correlation peaks of the first and second coded modulation image. Thus, the measurement range of the coded modulation may be defined by two or more coded modulation images obtained in the subsequent measurement in the second time interval. The two or more coded modulation images may represent two or more distances within the measurement range of the coded modulation of the modulated light (i.e. the distances of the correlation peaks of the two or more modulation images from the depth image sensor module). The two or more distances may be set by rotating a code sequence that is used for the coded modulation of the modulated light so that a correlation peak of the modulated light occurs at the two or more distances. This may enable performing the subsequent measurement within the region located between the depth image sensor module and the features of the environment in the second time interval, excluding the features of the background.

The method further comprises obtaining 120 a subsequent measurement of modulated light in a second time interval. For example, the second time interval may follow the first time interval. For example, the first time interval may be a calibration time interval or an initialization time interval, and the second time interval may be a time interval that is used for the detection of the airborne particles. In embodiments, the subsequent measurement of the modulated light may be obtained similar to the reference measurement of the modulated light, e.g. by receiving or reading out the subsequent measurement from the depth image sensor module or by performing the subsequent measurement using the depth image sensor module and then receiving or reading out the subsequent measurement from the depth image sensor module.

In some embodiments, the subsequent measurement may comprise a single subsequent measurement. Alternatively. e.g. when using coded modulation that is used at two or more distances from the depth image sensor module, the subsequent measurement may comprise two or more subsequent measurements. For example, the subsequent measurement of modulated light may comprise two or more coded modulation images representing two or more distances within the measurement range of the coded modulation of the modulated light. This may enable a detection of the airborne particles at the two or more distances. Additionally, the two or more coded modulation images may be used to deduce properties of the region that lies between the two or more distances, e.g. a density of a particle cloud formed by the airborne particles.

Airborne particles that are to be detected may have specific properties, such as a size that falls within a range of sizes to detect and/or a material composition of the airborne particles that are to be detected. In other words, the airborne particles that are to be detected may have a pre-defined size and/or a pre-defined material composition. Consequently, the modulated light may be chosen such, that (only) airborne particles with the pre-defined size and/or a pre-defined material composition are detected. If airborne particles with different material compositions are to be detected, or if a material composition of an airborne particle can be determined if the airborne particle is detected at one wavelength but not another wavelength, two or more different wavelengths may be used for the modulated light. In some embodiments, the modulated light may use two or more different wavelengths within the second time interval. The two or more different wavelengths may be chosen based on a reflectivity of the airborne particles at the two or more different wavelengths. The subsequent measurement may comprise two or more subsequent measurements that are based on the two or more different wavelengths, i.e. each subsequent measurement of the two or more subsequent measurements may be based on a single wavelength of the two or more different wavelengths. The method may comprise determining 138 a material composition of the airborne particles (such as a chemical composition and/or aggregate state of the airborne particles) based on the two or more subsequent measurements that are based on the two or more different wavelengths. Different materials of the airborne particles may react differently to different wavelengths of modulated light.

The method comprises detecting 130 the presence of the airborne particles based on the subsequent measurement of the modulated light. The presence of the airborne particles is detected by using the reference measurement performed in the first time interval to disregard all or part of the features of the environment of the depth image sensor module.

To disregard all or part of the features of the environment of the depth image sensor module, various approaches may be used. For example, in some cases, the modulated light may be based on a continuous wave modulation of light. The presence of the airborne particles may be detected based on a comparison between the subsequent measurement and the reference measurement. In this case, a comparison between depth values of the reference measurement and of depth values of the subsequent measurement may be used to disregard all or part of the features of the environment of the depth image sensor module: if the same depth value is present at corresponding positions within the reference measurement and within the subsequent measurement, the depth value may be disregarded, as it is based on the features of the environment of the depth image sensor module. The same or a similar approach may be taken if structured light without a coded modulation of the modulated light is used. This may facilitate an adaption of ToF cameras or of structured light cameras for the detection of the airborne particles, as the features of the background are disregarded in the processing of the subsequent measurement, without mandating changes to the ToF or structured light sensor or to the light emitter.

When using a coded modulation of the modulated light, a different approach may be used: instead of disregarding the features of the environment in the subsequent processing of the subsequent measurement, the modulated light itself may be adapted, so that the features of the environment do not influence the subsequent measurement of the modulated light. For example, the features of the background of the environment may be disregarded by setting the measurement range of the coded modulation of the modulated light to a region located between the depth image sensor module and the features of the environment in the second time interval, thereby excluding the features of the environment from the subsequent measurement, e.g. from the two or more coded modulation images of the subsequent measurement. In this case, (any) objects that are detected within the subsequent measurement that correspond to a pre-defined size of airborne particles may be deemed airborne particles in the detection of the presence of the airborne particles. In other words, the presence of the airborne particles may be detected if objects with an object size that corresponds to a pre-defined size of airborne particles are detected within the subsequent measurement, e.g. within the two or more coded modulation images.

Similar to a "normal" camera sensor, the depth image sensor module may provide the subsequent measurement using a two-dimensional grid of pixels. The subsequent measurement may be represented by a plurality of pixels, e.g. a plurality of pixels arranged in a two-dimensional grid. Pixels of the two-dimensional grid of pixels may each indicate at least one of a distance of a measured object (i.e. of an airborne particle) to the depth image sensor module that is measured based on the incident modulated light (i.e. depth information), an amplitude/intensity of the reflected modulated light incident to the pixel (i.e. amplitude information) and a phase of the reflected modulated light incident to the pixel (i.e. phase information).

In at least some embodiments, the subsequent measurement of the modulated light may comprise one or more coded modulation images comprising at least one of the amplitude information, the phase information and the depth information. In other words, the one or more coded modulation images may comprise information related to a sensor response function to the modulated light in the second time interval. The presence of the airborne particles may be detected based on the sensor response function to the modulated light in the second time interval, e.g. based on at least one of the amplitude information, the phase information and the depth information of the one or more coded modulation images. The signal indicative of one or more properties of the detected airborne particles may be generated based on the sensor response function to the modulated light in the second time interval, e.g. based on at least one of the amplitude information, the phase information and the depth information of the one or more coded modulation images. The amplitude information may, alongside depth information or phase information, be used to detect the airborne particles. The same also applies in embodiments that are based on continuous wave modulated light or based on structured light. Consequently, in more general terms, the subsequent measurement may comprise the sensor response function to the modulated light in the second time interval, e.g. at least one of the amplitude information, the phase information and the depth information. The presence of the airborne particles may be detected based on the sensor response function to the modulated light in the second time interval, e.g. based on at least one of the amplitude information, the phase information and the depth information of the subsequent measurement.

The method comprises generating 140 the signal indicative of one or more properties of the detected airborne particles based on the detected presence of the airborne particles. For example, the signal indicative of the one or more properties of the detected airborne particles may comprise at last one of information related to a location of the airborne particles, information related to a composition of the airborne particles, information related to an extent of the airborne particles, information related to a density of the airborne particles (i.e. of a particle cloud formed by the airborne particles), and information related to a volume of the airborne particles. The composition of the airborne particles may refer to a material composition of the airborne particles, i.e. which chemical elements and/or aggregate states of the chemical elements the airborne particles comprise or are composed of. Alternatively or additionally, the composition of the airborne particles may refer to two or more different types of airborne particles that are detected, and to the relative share of the two or more different types of airborne particles among the detected airborne particles. The extent of the airborne particles may refer to at least one of a width, a height and a depth of a particle cloud formed by the airborne particles. The volume of the airborne particles may refer to a volume or capacity of a particle cloud formed by the airborne particles.

For example, the airborne particles may form a particle cloud of airborne particles, such as a smoke cloud or a steam cloud. The signal indicative of the one or more properties of the detected airborne particles comprises information related to at least one of a location, an extent, a volume, a density and a composition of the particle cloud. This may enable an assessment of the properties of the particle cloud in a subsequent processing of the signal.

As shown in FIG. 1b, the method may further comprise determining 132 the information related to a location of the airborne particles based on the one or more coded modulation images. For example, the depth information of the one or more coded modulation images may be used determine the information related to a location of the airborne particles, e.g. along with a position within the two-dimensional grid of a pixel providing the depth information. The signal indicative of the one or more properties of the detected airborne particles may comprise the information related to the location of the airborne particles. The location of the airborne particles may e.g. be used in a further processing step.

The method may further comprise determining 134 the information related to a composition of the airborne particles based on the one or more coded modulation images. The signal indicative of one or more properties of the detected airborne particles may comprise the information related to the composition of the airborne particles. The composition of the airborne particles may e.g. be used to distinguish smoke from steam, rain from snow etc. For example, the information related to the composition of the airborne particles may be determined using two or more different wavelengths, as described above. For example, each material (chemical composition) of interest may be determined using a different wavelength of the two or more different wavelengths. Alternatively, a reflection pattern of the airborne particles may be used. For example, different compositions of the airborne particles may lead to different patterns in the amplitude information of the subsequent measurement (e.g. of the one or more coded modulation images). Consequently, the method may comprise differentiating different compositions of the airborne particles based on a pattern of the airborne particles in the amplitude information of the subsequent measurement (e.g. of the one or more coded modulation images). For example, the different patterns may be differentiated using a machine-learning algorithm, i.e. based on a pre-trained neural network or support-vector machine. In other words, the composition of the airborne particles may be determined using a machine-learning algorithm. The one or more coded modulation images may be used as input for the machine-learning algorithm. The information related to the composition of the airborne particles may be based on the output of the machine-learning algorithm, in case of coded modulation, the machine-learning algorithm may be pre-trained using example coded modulation images as training input and example composition information as training output. This may enable a determination of the composition of the airborne particles by using previously collected training samples.

Embodiments may be used in different scenarios, e.g. in a vehicle, to detect rain, snow etc. outside the vehicle, or in a cooking environment, to detect smoke etc. For example, the determination of the composition of the airborne particles may be adjusted to the scenario, in which embodiments are used.

For example, the subsequent measurement of modulated light may be taken of an environment of a vehicle. For example, the depth image sensor module may be comprised in a sensor system of the vehicle. On the one hand, the depth image sensor module may be used for distance sensing, e.g. to support an assisted parking functionality of the vehicle. On the other hand, using embodiments, the depth image sensor module may be used to detect the weather conditions outside the vehicle. In other words, the information related to the composition may indicate whether the airborne particles comprise at least one of rain, snow, fog, dust and hail. The method may comprise detecting at least one rain, snow, fog, dust and hail based on the detected presence of the airborne particles This may enable an application of the approach in a vehicle, e.g. to enable a hazard assessment of airborne particles surrounding the vehicle.

Alternatively, embodiments may be used in a cooking appliance or in a smoke alarm. For example, the information related to the composition may indicate whether the airborne particles primarily comprise steam or whether the airborne particles primarily comprise smoke. In other words, the method may comprise distinguishing between steam and smoke in the determination of the information related to the composition.

In some embodiments, the method may comprise detecting 160 a presence of steam or smoke among the airborne particles. For example, the presence of steam or smoke among the airborne particles may be detected based on the determined information related to the composition of the airborne particles. The method may comprise providing the signal indicative of one or more properties of the detected airborne particles to a cooking appliance (such as a stove or an oven) based on the detected presence of steam or smoke, i.e. to cause the cooking appliance to turn down the heat, or to cause the cooking appliance to raise an alarm. For example, the signal indicative of one or more properties of the detected airborne particles may indicate and/or differentiate, whether a presence of steam or whether a presence of smoke is detected among the airborne panicles.

In various embodiments, the method may comprise detecting 170 a presence of smoke based on the detected presence of the airborne particles. For example, the presence of smoke may be detected based on the determined information related to the composition of the airborne particles. The method may comprises raising a smoke alarm based on the detected smoke using the signal indicative of one or more properties of the detected airborne particles. To achieve this, the signal indicative of the one or more properties of the detected airborne particles may be provided to a siren or horn. The signal indicative of the one or more properties of the detected airborne particles being provided to the siren or horn may indicate that the one or more particles comprise smoke. This may enable the application of the approach in a smoke sensor of a cooking appliance. As further shown in FIG. 1b, the method may further comprise detecting 180 one or more living beings based on the subsequent measurement and based on the reference measurement. The detection of the one or more living beings may be performed after the smoke is detected. The signal indicative of one or more properties of the detected airborne particles may further comprise information related to the detected one or more living beings. This may enable differentiating in the generation of the smoke alarm based on whether living beings are present, e.g. to allow for a higher threshold before raising the smoke alarm if a human being is detected close by and presumably handling the situation that led to the smoke being generated.

As written above, the airborne particles may form a particle cloud of airborne particles, such as a smoke cloud or a steam cloud. As a particle cloud usually extends in three dimensions, i.e. has a width, height and depth, two or more subsequent measurements may be used to determine some of the one or more properties of the particle cloud, such as a density of the particle cloud, a volume of the particle cloud, and an extend of the particle cloud. In other words, the method may comprise determining 136 the information related to at least one of the density, the volume and the extent of the particle cloud based on two or more coded modulation images representing two or more distances within the measurement range of the coded modulation of the modulated light. For example, the volume of the particle cloud (in three dimensions) may be determined based on a height and width of the particle cloud within the two or more coded modulation images, e.g. by estimating a three-dimensional extent (i.e. height, width and depth) of the particle cloud based on the height and width height and width of the particle cloud within the two or more coded modulation images and based on the two or more distances. Similarly, the extent of the particle cloud may be determined based on the height and width of the particle cloud within the two or more coded modulation images and based on the two or more distances. The density of the particle cloud may be determined based on the amplitude information of the two or more coded modulation images. A first higher density of the particle cloud may be determined if an attenuation of the amplitude information between the two or more distances is higher, and a second lower density of the particle cloud may be determined if the attenuation of the amplitude information between the two or more distances is lower. By comparing properties of the two or more coded modulation images, the properties of airborne particles that are located between the two or more distances may be deduced.

In at least some embodiments, at least parts of the method may be executed repeatedly, e.g. repeated periodically. For example, the subsequent measurement may be obtained periodically, the detection of the presence of the airborne particles may be repeated based on the periodically obtained subsequent measurement, and the signal indicative of the one or more properties of the detected airborne particles may be updated accordingly.

In embodiments the processing module 14 may be implemented using one or more processing units, one or more processing devices, any means for processing, such as a processor, a computer or a programmable hardware component being operable with accordingly adapted software. In other words, the described function of the processing module 14 may as well be implemented in software, which is then executed on one or more programmable hardware components. Such hardware components may comprise a general-purpose processor, a Digital Signal Processor (DSP), a micro-controller, etc. The interface 12 may correspond to one or more inputs and/or outputs for receiving and/or transmitting information, which may be in digital (bit) values according to a specified code, within a module, between modules or between modules of different entities. The interface 12 is coupled with the processing module 14.

Embodiments further provide a computer program product comprising a computer readable medium having computer readable program code embodied therein, the computer readable program code being configured to implement the method, when being loaded on a computer, a processor, or a programmable hardware component.

More details and aspects of the method, apparatus, system and computer program are mentioned in connection with the proposed concept or one or more examples described above or below (e.g. FIG. 2 or 3). The method, apparatus, system and computer program may comprise one or more additional optional features corresponding to one or more aspects of the proposed concept or one or more examples described above or below.

At least some embodiments may provide an airborne particle detection using Time of Flight (ToF) sensors. Various embodiments may enable devices equipped with a ToF sensor to detect small airborne particles, which otherwise would require additional sensors. Such particles may include dust, fog, rain, snow, fume and vaporized water.

Embodiments may enable ToF camera sensors (among others) to detect small airborne particles using modulation coding. The modulation code may be chosen in a manner so that (only) free space in front of the camera is covered (e.g. the measurement range of the coded modulation of the modulated light to a region located between the depth image sensor module and the features of the environment). This may be done dynamically by producing a conventional depth image (e.g. the reference measurement in the first time interval) and then adjusting the modulation code to the scenery (for the subsequent measurement in the second time interval). If particles in the air are present, light gets reflected from them, Which the ToF camera may observe. Objects in the scene (e.g. the features of the background of the environment of the depth image sensor module) might not be present in the camera measurement (e.g. in the subsequent measurement) due to the modulation coding, as the code may be chosen in a way to correlate only in the free space in front of the camera.

Figure 2:
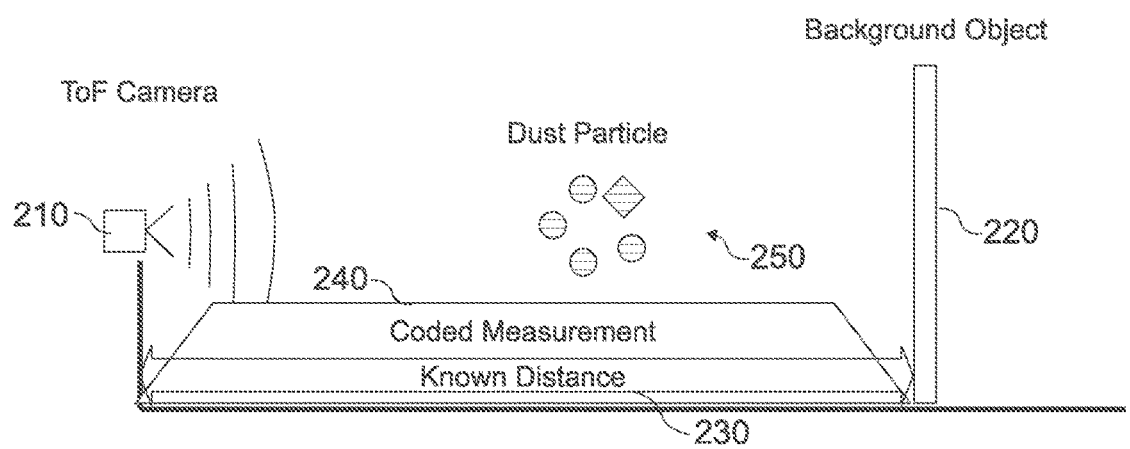
FIG. 2 shows a schematic illustration of embodiment, in which a dust particle is detected.

FIG. 2 shows a schematic illustration of an embodiment, in which a dust particle is detected, and a background of the object not. FIG. 2 shows ToF camera 210 (e.g. the depth image sensor module or the system comprising the depth image sensor module), the background object 220, a known distance between the background object 220 and the ToF camera 210, a measurement range of the coded modulation of modulated light, and dust particle 250. In FIG. 2, the known distance between the background object 220 and the ToF camera 210 may be used to define the measurement range of the coded modulation of modulated light, which may enable the detection of the dust particle, while disregarding the background object.

Figure 3:
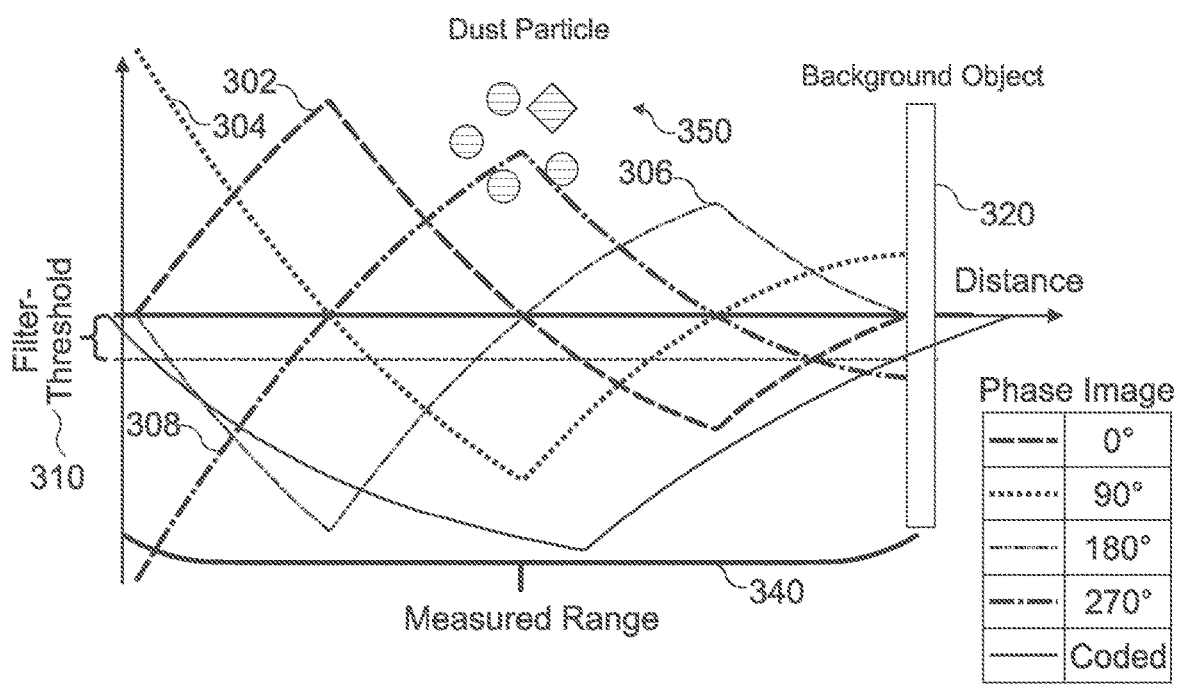
FIG. 3 shows a schematic of a comparison of coded modulation and continuous wave ToF sensing.

FIG. 3 shows a coded modulation versus continuous wave ToF sensing at 0°, 90°, 180°, 270° phase (reference signs 302, 304, 306 and 308, respectively). Reference sign 310 denotes the Filter Threshold, reference sign 320 denotes the background object, reference sign 340 denotes the measured range (e.g. the measurement range of the coded modulation), and reference sign 350 denotes the dust particle (e.g. an airborne particle). A correlation output might only be produced between the ToF camera (not shown) and the background object 320, i.e. within the measured range 340.

In the following, some exemplary embodiments are presented.

In a first example, a conventional continuous wave ToF imaging may be used instead of coded modulation. The (airborne) particles may be detected by comparing a reference image (e.g. the reference measurement) with a measured image (e.g. the subsequent measurement).

In a second example, multiple coded modulation images may be taken (e.g. the one or more coded modulation images) to retrieve the amplitude image of the airborne particles.

In a third example, information about a location and a size of a volume of a particle cloud comprising smoke may be provided.

In a fourth example, two coded modulation images with correlation peaks at different depths may be used (e.g. the two or more coded modulation images) for measuring the attenuation of the light (between the different depths) and consequently the particle density.

In a fifth example, as structured light also measures depth, it may also be used to detect airborne particles, similar to the first example. Structured light sensors may also use modulation coding.

A sixth example may provide a fume and steam detection for kitchen appliances (e.g. the cooking appliance). A ToF sensor (e.g. the depth image sensor module) may survey a kitchen stove and may detect steam caused by boiling water. The ToF sensor may be part of the stove or communicate to the stove that the heat should be regulated (e.g. using the signal indicative of the one or more properties of the detected airborne particles), The ToF sensor might also be part of a cooking heat control loop. This may enable the user to leave boiling dishes alone until they are boiled.

In a seventh example, the ToF camera might be used as a smoke detector. The camera may detect smoke even before it reaches a ceiling mounted smoke detector. As the camera is not limited to particle detection, compared to specialized sensors, it may be used to detect people in the room (e.g. the one or more living beings).

In an eight example, the ToF sensor may be used for automotive adversarial weather detection. It may be used to differentiate between snow and rain. It might also be used to detect fog and its density using the fourth example. This may provide valuable information for autonomous driving.

At least some embodiments may detect airborne particle by sending out coded infrared light, where the received light signal (e.g. the subsequent measurement) might only be influenced by the reflections of the airborne particles. The coded light signal may be adapted to the scenery to only measure free space.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal;" "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim

What is claimed is:

1. A method for detecting a presence of airborne particles, the method comprising:
    obtaining a reference measurement of an environment of a depth image sensor module, the reference measurement being based on a measurement of modulated light in a first time interval, wherein the modulated light is reflected by features of the environment of the depth image sensor module, wherein the modulated light is based on a coded modulation of light;
    obtaining a subsequent measurement of modulated light in a second time interval;
    detecting the presence of the airborne particles based on the subsequent measurement of the modulated light, wherein the presence of the airborne particles is detected by using the reference measurement performed in the first time interval to disregard all or part of the features of the environment of the depth image sensor module;
    generating a signal indicative of one or more properties of the detected airborne particles based on the detected presence of the airborne particles;
    determining a distance between the depth image sensor module and the features of the environment based on the reference measurement of the environment; and
    setting a measurement range of the coded modulation of the modulated light to a region located between the depth image sensor module and the features of the environment in the second time interval,
    wherein the subsequent measurement of modulated light comprises two or more coded modulation images representing two or more distances within the measurement range of the coded modulation of the modulated light, and/or wherein the distance between the depth image sensor module and the features of the environment is determined based on two or more coded modulation images comprised in the reference measurement.

2. The method of claim 1, further comprising:
determining information related to a location of the airborne particles based on the two or more coded modulation images, wherein the signal indicative of the one or more properties of the detected airborne particles comprises the information related to the location of the airborne particles.

3. The method of claim 1, further comprising:
determining information related to a composition of the airborne particles based on the two or more coded modulation images, wherein the signal indicative of one or more properties of the detected airborne particles comprises the information related to the composition of the airborne particles.

4. The method of claim 3, wherein the information related to the composition indicates whether the airborne particles primarily comprise steam or whether the airborne particles primarily comprise smoke.

5. The method of claim 3, wherein the composition of the airborne particles is determined using a machine-learning algorithm, wherein the two or more coded modulation images are used as input for the machine-learning algorithm, wherein the machine-learning algorithm is pre-trained using example coded modulation images as training input and example composition information as training output.

6. The method of claim 1, wherein the modulated light is based on an emission of structured light.

7. The method of claim 1, wherein the modulated light is based on a continuous wave modulation of light, and wherein the presence of the airborne particles is detected based on a comparison between the subsequent measurement and the reference measurement.

8. The method of claim 1, further comprising:
emitting the modulated light, wherein the modulated light uses two or more different wavelengths within the second time interval, wherein the subsequent measurement comprises two or more subsequent measurements that are based on the two or more different wavelengths; and
determining a material composition of the airborne particles based on the two or more subsequent measurements that are based on the two or more different wavelengths.

9. An apparatus for detecting a presence of airborne particles, the apparatus comprising:
an interface comprising one or more inputs and/or outputs and configured to communicate with a depth image sensor module;
a processing module configured to:
obtain a reference measurement of an environment of the depth image sensor module from the depth image sensor module, wherein the reference measurement is based on a measurement of modulated light in a first time interval, wherein the modulated light is reflected by features of the environment of the depth image depth image sensor module, wherein the modulated light is based on a coded modulation of light;
obtain a subsequent measurement of modulated light from the depth image sensor module in a second time interval;
detect the presence of the airborne particles based on the subsequent measurement of the modulated light, wherein the presence of the airborne particles is detected by using the reference measurement performed in the first time interval to disregard all or part of the features of the environment of the sensor module;
generate a signal indicative of one or more properties of the detected airborne particles based on the detected presence of the airborne particles;
determine a distance between the depth image sensor module and the features of the environment based on the reference measurement of the environment; and
set a measurement range of the coded modulation of the modulated light to a region located between the depth image sensor module and the features of the environment in the second time interval,
wherein the subsequent measurement of modulated light comprises two or more coded modulation images representing two or more distances within the measurement range of the coded modulation of the modulated light, and/or wherein the distance between the depth image sensor module and the features of the environment is determined based on two or more coded modulation images comprised in the reference measurement.

10. A system comprising the apparatus of claim 9 and the depth image sensor module, wherein the depth image sensor module is configured to perform the reference measurement and the subsequent measurement, and wherein the depth image sensor module is configured to provide the reference measurement and the subsequent measurement to the processing module via the interface.

11. A method for detecting a presence of airborne particles, the method comprising:
obtaining a reference measurement of an environment of a depth image sensor module, the reference measurement being based on a measurement of modulated light in a first time interval, wherein the modulated light is reflected by features of the environment of the depth image sensor module, wherein the modulated light is based on a coded modulation of light;
obtaining a subsequent measurement of modulated light in a second time interval;
detecting the presence of the airborne particles based on the subsequent measurement of the modulated light, wherein the presence of the airborne particles is detected by using the reference measurement performed in the first time interval to disregard all or part of the features of the environment of the depth image sensor module;
generating a signal indicative of one or more properties of the detected airborne particles based on the detected presence of the airborne particles, wherein the airborne particles form a particle cloud of airborne particles, wherein the signal indicative of the one or more properties of the detected airborne particles comprises information related to at least one of a location, an extent, a volume, a density and a composition of the particle cloud;
determining a distance between the depth image sensor module and the features of the environment based on the reference measurement of the environment; and
setting a measurement range of the coded modulation of the modulated light to a region located between the depth image sensor module and the features of the environment in the second time interval; and
determining the information related to at least one of the density, the volume and the extent of the particle cloud based on two or more coded modulation images representing two or more distances within the measurement range of the coded modulation of the modulated light.

* * * * *